(12) United States Patent
Giraud

(45) Date of Patent: Mar. 19, 2019
(10) Patent No.: US 10,232,824 B2

(54) SYSTEM AND METHOD FOR WIPING A VEHICLE WINDOW

(71) Applicant: Valeo Systèmes d'Essuyage, Le Mesnil Saint Denis (FR)

(72) Inventor: Frédéric Giraud, Le Perray en Yvelines (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 15/247,029

(22) Filed: Aug. 25, 2016

(65) Prior Publication Data
US 2017/0072909 A1 Mar. 16, 2017

(30) Foreign Application Priority Data
Sep. 14, 2015 (FR) ...................... 15 58549

(51) Int. Cl.
*B60S 1/08* (2006.01)
*B60S 1/48* (2006.01)
*B60S 1/52* (2006.01)

(52) U.S. Cl.
CPC .......... *B60S 1/0814* (2013.01); *B60S 1/0818* (2013.01); *B60S 1/485* (2013.01); *B60S 1/524* (2013.01); *B60S 1/0848* (2013.01)

(58) Field of Classification Search
CPC ...... B60S 1/0814; B60S 1/0818; B60S 1/485; B60S 1/0848; B60S 1/524
USPC .............................. 15/250.3, 250.02, 250.04
See application file for complete search history.

(56) References Cited

U.S. PATENT DOCUMENTS

2016/0090068 A1* 3/2016 Kaminaga ............... B60S 1/481
15/250.02

FOREIGN PATENT DOCUMENTS

FR 2991948 A1 12/2013

* cited by examiner

*Primary Examiner* — Gary K. Graham
(74) *Attorney, Agent, or Firm* — Osha Liang LLP

(57) ABSTRACT

System for wiping a vehicle window, the said window being equipped with a sensor, comprising a first wiper (15) which can wipe a first area of the window, including a portion (8, 8') which extends at the level of the said sensor, a second wiper (13) which can wipe a second area of the window, different from the said first area, means for activation of the said first and second wipers for the purpose of their displacement on the window, and electronic means for control of the said means for activation, characterized in that the said means for activation comprise a first motor for activation of the said first wiper, and a second motor for activation of the said second wiper, and in that the said control means are configured to activate only the said first motor when cleaning of the said portion is required.

14 Claims, 4 Drawing Sheets

SYSTEM AND METHOD FOR WIPING A VEHICLE WINDOW

The present invention relates to a system and a method for wiping a vehicle window, in particular a motor vehicle window.

A motor vehicle is conventionally equipped with windscreen wipers in order to ensure washing of the windscreen, and to prevent the view which the driver has of his environment from being disrupted.

A windscreen is in general equipped with two windscreen wipers, one of which is designed to wipe a first area of the window, and a second one of which is designed to wipe a second area of the window which is different from the first aforementioned area.

These windscreen wipers generally comprise a drive arm which performs an angular to-and-fro movement, and elongate wipers, which themselves support scraper blades made of a resilient material. These blades rub against the windscreen and discharge water, bringing it outside the field of vision of the driver. The wipers are produced in the form, either, in a conventional version, of articulated clamps which hold the scraper blade in a plurality of discrete locations, providing it with curving which allows it to follow any curvature of the windscreen, or, in a more recent version known as flat blade, of a semi-rigid assembly which retains the scraper blade along its entire length by means of one or more curving vertebrae which allow the wiper to be applied on the windscreen without needing to use clamps.

It is known to equip the windscreen of a vehicle with a sensor, for example for rain. This sensor is situated inside the passenger space of the vehicle, and can be applied against an inner surface of the window. The sensor is designed to detect information through the windscreen, such as the presence of water.

Document FR-A1-2 991 948 describes a system for wiping and washing a vehicle window, this window being equipped with an element or sensor for analysis of the state of the windscreen.

The efficiency of the sensor is associated in particular with the cleanliness of the windscreen, and in particular with the portion of the windscreen which covers the sensor. The windscreen wipers are in general used to clean this portion, which thus forms part of one of the areas swept by the wipers. In the case when the portion is dirty and must be cleaned, the windscreen wipers are activated and travel over all of the aforementioned areas, even if these areas are less dirty than the portion in question, and do not necessarily need to be cleaned.

This situation has a disadvantage. At least one of the windscreen wipers thus activated is not useful for the cleaning of the portion, and can impede the driver, and in particular cross his field of vision in the case of the wiper which is on the driver's side, and thus disrupt him. This is all the more true when the cleaning of the portion by the windscreen wipers is carried out automatically, without a specific command by the driver.

The invention proposes a solution to this problem which is simple, efficient and economical.

For this purpose, the invention proposes a system for wiping a vehicle window, the said window being equipped with a sensor, the system comprising:
a first wiper which can wipe a first area of the window, including a portion which extends at the level of the said sensor;
a second wiper which can wipe a second area of the window, different from the said first area;
means for activation of the said first and second wipers for the purpose of their displacement on the window; and electronic means for control of the said means for activation, characterized in that the said means for activation comprise a first motor for activation of the first wiper, and a second motor for activation of the said second wiper, and in that the said control means are configured to activate only the said first motor when cleaning of the said portion is required.

The sensor is for example a rain sensor, a sun sensor, a fog sensor, a dirt sensor, a traffic sign sensor, a camera, video camera, a laser-based optical sensor, etc.

The invention thus proposes to make a single one of the wipers function when the portion covering the sensor must be cleaned, and not the rest of the window. The other wiper remains immobile, and is therefore not liable to impede the driver of the vehicle.

The system according to the invention can comprise one or more of the following characteristics, taken in isolation or in combination with one another:
the said control means are configured to activate the said first and second motors when cleaning of the said first and second areas is required;
the said first wiper is a wiper which is configured to be situated on the driver's side of the vehicle;
the said first wiper is a wiper which is configured to be situated on the passenger's side of the vehicle;
the said portion is situated substantially in the middle of the window;
the said portion is situated on one side of the window;
the system comprises means for spraying cleaning liquid, the said control means being configured to activate spraying of liquid when cleaning of the said portion is required;
the said spraying means are supported by the said first wiper; and
the said spraying means and/or the said control means are configured to spray liquid from one side only of the said first wiper and/or during a phase of descent of the said first wiper on the window.

The present invention also relates to a method for wiping a vehicle window by means of a system according to one of the preceding claims, comprising a step consisting of:
b) activating only the said first motor when cleaning of the said portion is required, the said second motor remaining inactive. The method can comprise a preliminary step consisting of:
a) emitting a signal to the said control means for the purpose of activation only of the said first motor.

Preferably the emission of the said signal is derived from a command issued by the driver of the vehicle, or by detection of dirt on the said portion by the said sensor.

During the step b), the method can comprise a sub-step consisting of activating spraying of liquid onto the window.

The spraying of liquid can take place from one side only of the said first wiper. The spraying of liquid can take place during a phase of descent of the said first wiper on the window.

The invention will be better understood, and other details, characteristics and advantages of it will become apparent from reading the following description provided by way of non-limiting example, with reference to the appended drawings, in which:

FIG. 1 illustrates a window 1 of a vehicle, for example a motor vehicle. A window of this type is in this case a windscreen 1 which is delimited by an inner face facing towards the passenger space of the vehicle, as well as by an outer face facing towards the exterior of the vehicle.

A wiping system 2 is installed on this windscreen 1, in particular such as to discharge water which is present on the outer face, and optionally to ensure spraying of a washing liquid on this same face.

Figure 1:
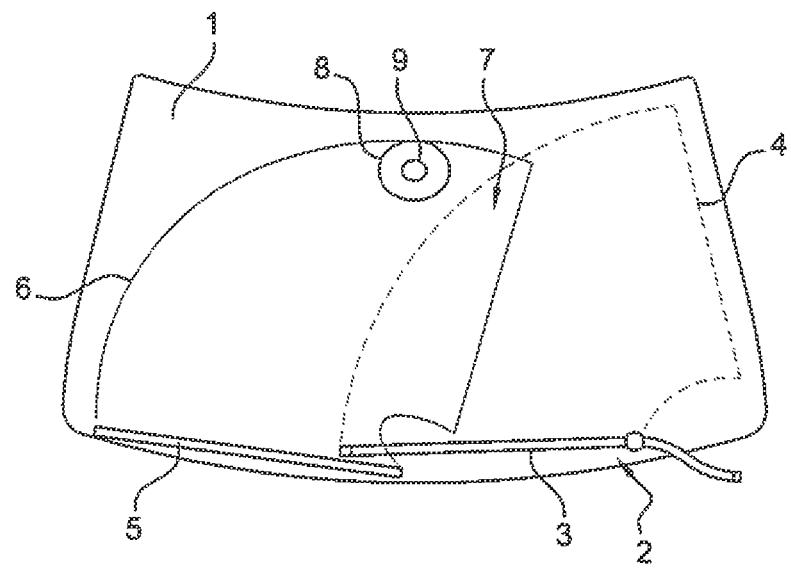
FIG. 1 is a schematic view of a vehicle window equipped with a wiping system and a sensor.

In FIG. 1, the system 2 is illustrated in a position of rest, i.e. in a position in which functioning of the system 2 is not required. This system 2 comprises a first wiper 3, which is designed to wipe a first area 4 of the windscreen 1, the latter being illustrated by a broken line which delimits the first area 4. This first area 4 is in this case on the driver's side of the vehicle, the first wiper 3 being configured to be fitted on the driver's side of the vehicle for a left-hand drive.

The first wiper 3 is connected to a first point of rotation by means of a first activation arm (not represented), the first blade and the first arm performing a to-and-fro movement whilst sweeping the first area 4. The movement of rotation of the first arm is performed by means for activation, not represented.

The system 2 also comprises a second wiper 5 which is designed to wipe an area 6 of the windscreen 1 which is at least partly different from the first area 4 of the windscreen 1. Hereinafter in the description, this area which is swept by the second wiper 5 will be known as the second area 6 of the windscreen 1, this last area being illustrated by a solid line which surrounds the second area 6. It will be noted that the first area 4 and the second area 6 of the windscreen 1 overlap at least on a central part of the windscreen, which is delimited both by a solid line and a broken line, and has the reference 7 in FIG. 1.

The invention relates more particularly to the cleaning of the second area 6 of the windscreen which does not overlap the first area 4 of this windscreen 1. More particularly, the invention envisages cleaning of an upper portion of the second area 6, this portion being surrounded by a circle with the reference 8 in FIG. 1. This portion 8 of the second area 6 of the windscreen 1 receives a sensor 9 which analyses the state of the windscreen 1 or the state of the road situated in front of the vehicle. It can thus be a rain sensor which is integral with the inner face of the windscreen 1, and installed level with the upper part 6. It can also be a sun sensor, a photographic device, or an optical laser sensor, or a camera, in particular for night vision. Finally it can be a sensor for fog, dirt, or a traffic sign detector.

The second area 6 is on the passenger side of the vehicle, the second wiper 5 being configured to be fitted on the passenger side of the vehicle with a left-hand drive. The second wiper 5 is connected to a second point of rotation by means of a second arm (not represented), the second wiper 5 and the second arm performing a to-and-fro movement whilst sweeping the second area 6 of the windscreen 1. The movement of rotation of the second arm is performed by the same means for activation previously described for the prior art.

Figure 2:
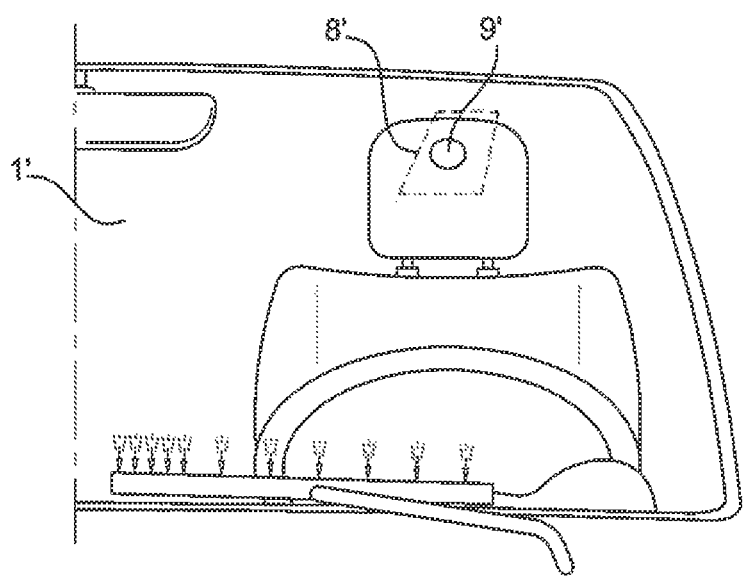
FIG. 2 is another schematic view of a vehicle window equipped with a wiping system and a sensor.

FIG. 2 illustrates a window 1' of another motor vehicle, on which a wiping system 2' is installed, only the first wiper 3" of which is represented. The window is equipped with a sensor 9' which is covered by a portion 8'.

FIGS. 1 and 2 represent the art prior to the present invention, and show two different positions of a window sensor, i.e. in the middle of the window (FIG. 1) and on the driver's side of the vehicle (FIG. 2).

Figure 3:
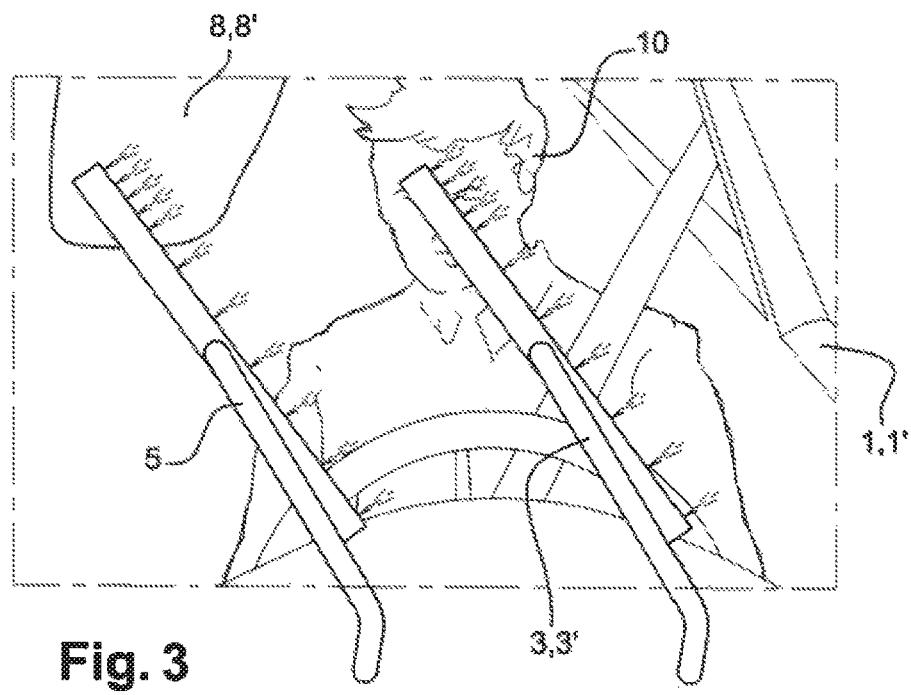
FIG. 3 is another schematic view of a vehicle window equipped with a wiping system and a sensor, the wiping system being in operation.

In these two cases, and as shown in FIG. 3, the operation of the wiping systems in order to clean the portion 8, 8' is liable to impede the drivers view, even if this portion is not situated on the driver's 10 side of the vehicle.

Figure 4:
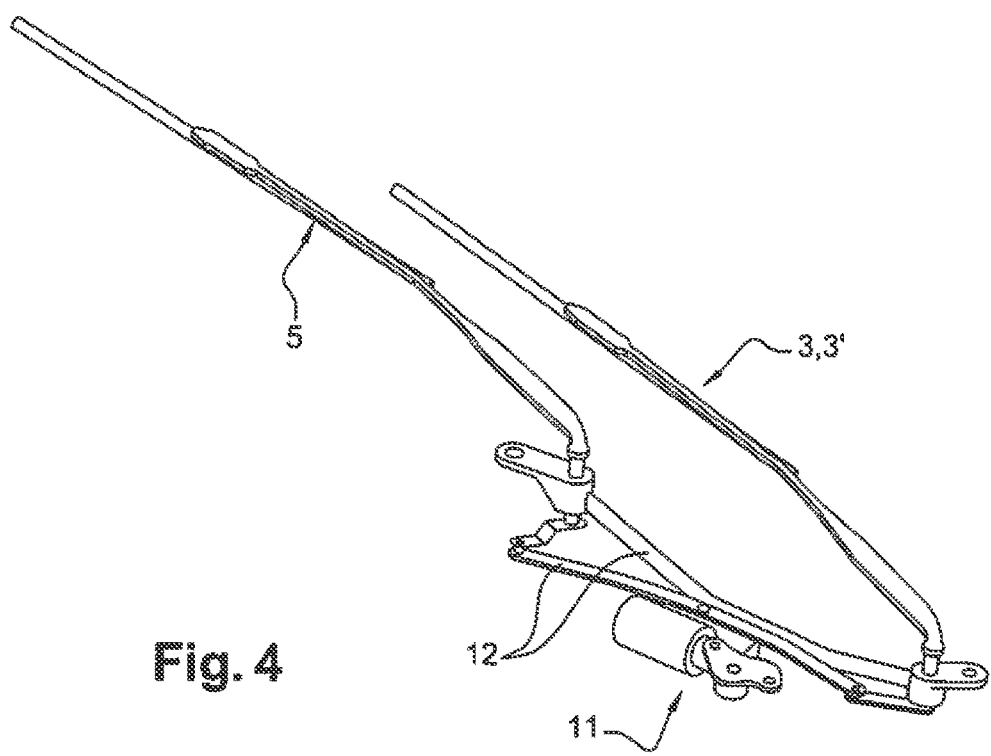
FIG. 4 is a schematic view in perspective of a wiping system according to the prior art with a single means for activation of the wipers.

FIG. 4 shows a wiping system according to the prior art, and in particular the common means for activation of its wipers 3, 3', 5. These means for activation comprise a single motor 11, the output shaft of which is connected by a linkage or rod assembly 12 to the drive arms of the two wipers.

Figure 5:
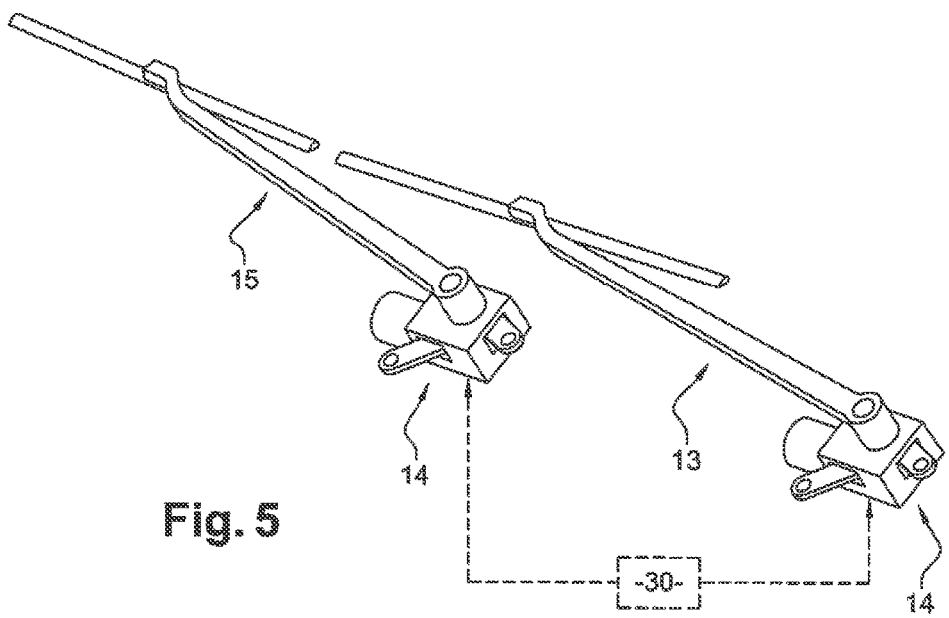
FIG. 5 is a schematic view in perspective of a wiping system according to the invention with a wiper activation means.

FIG. 5 shows a wiping system according to the invention, in which the means for activation of the wipers 13, 15 comprise two independent motors 14. A first motor 14 is configured to activate the first wiper 13, on the driver's side in the aforementioned example, and the second motor is configured to activate the second wiper 15 on the passenger's side.

Figure 6:
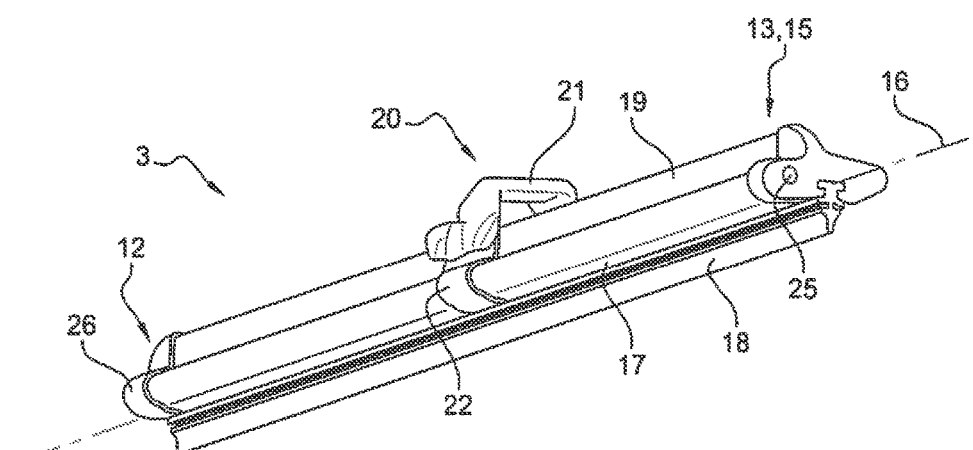
FIG. 6 is a schematic view in perspective of a wiper.

Each wiper 13, 15 can be of the scraper and control stick type. It can also be a flat wiper known as a flat blade, as represented in FIG. 6, or of a mixed type (also known as hybrid).

Each wiper 13, 15 comprises a support 17, inside which a strengthening vertebra is accommodated. The support 17 also comprises a longitudinal cavity in which a scraper is inserted, otherwise known as a wiper blade 18. The latter is a flexible component of the wiper which is supported against the outer face of the windscreen.

On its upper part, the support 17 is covered by a deflector 19 which is designed to use the dynamic effect of the displacement of the vehicle in order to increase the support force of the wiper 13, 15 on the windscreen.

Alternatively, the wiper 13, 15 can comprise two strengthening vertebrae. In this case, the two vertebrae are rendered integral with the component wiper blade 18 of the wiper 13, 15, and the latter is without a support 17. The wiper blade 18 can be provided with two open slots along the wiper 13, 15, arranged laterally in the latter, these two slots each receiving a strengthening vertebra.

Substantially in the centre of the wiper 13, 15, there is a means 20 for rendering the wiper integral on the arm which generates its movement, and in particular its rotation. This means 20 for rendering integral comprises at least one adapter 21 which is connected by means of a pivot connection to a connector 22. The latter ensures mechanical engagement on the support 17 of the wiper 13, 15, whereas the adapter 21 serves the purpose of ensuring a mechanical connection between an end of the arm and the connector 22. An adapter 21 of this type is consequently a part, the form of which can be modified according to the form of the end of the arm, for example an end which is straight, or in the form of a hook, or which has a tilting finger and one or more lugs for rendering integral.

At each of its ends, the wiper is provided with a joining piece 25, 26 with at least one receptacle which allows it to be fitted at least on the support 17.

The system 2 according to the invention also comprises a device for supplying the windscreen 1 with washing liquid. This supply device comprises at least one tube for transport of the washing liquid, which is installed between at least one pump for circulation of the liquid, and each wiper 13, 15.

The supply device 10 can include this circulation pump, and optionally a module for control of the circulation of the liquid, comprising in particular at least one valve and/or a shutter, this control module then being installed between the circulation pump and the wipers, and being connected to these components by tubes for transport of the washing liquid.

The wipers 13, 15 are provided with means for spraying the washing liquid, such as to spray it at least on the areas 4, 6 of the windscreen 1.

Figure 7:
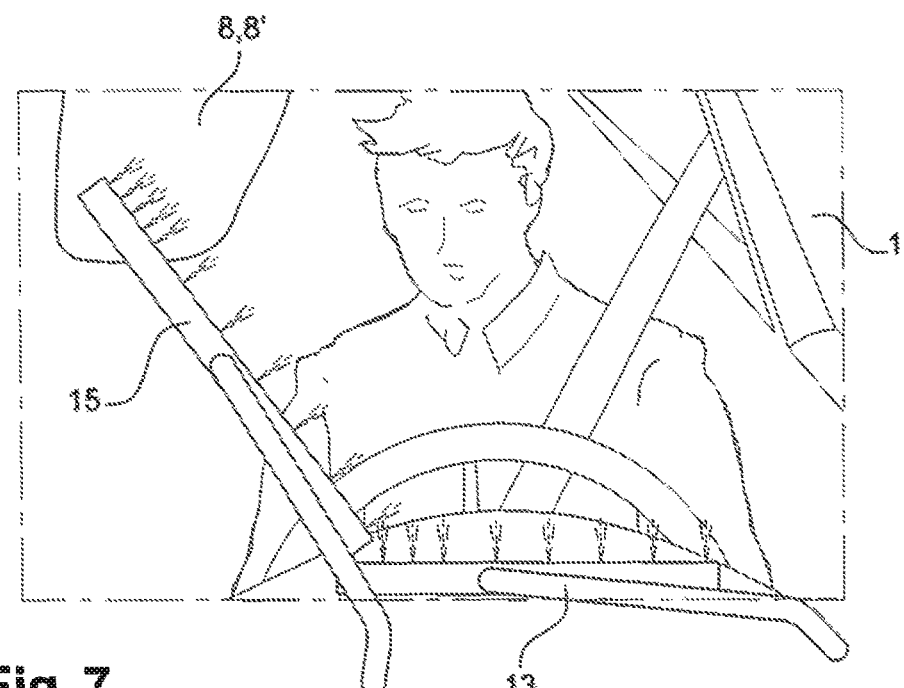
FIGS. 7 and 8 are views corresponding to that in FIG. 3, illustrating a wiping system according to the invention in operation.
Figure 8:
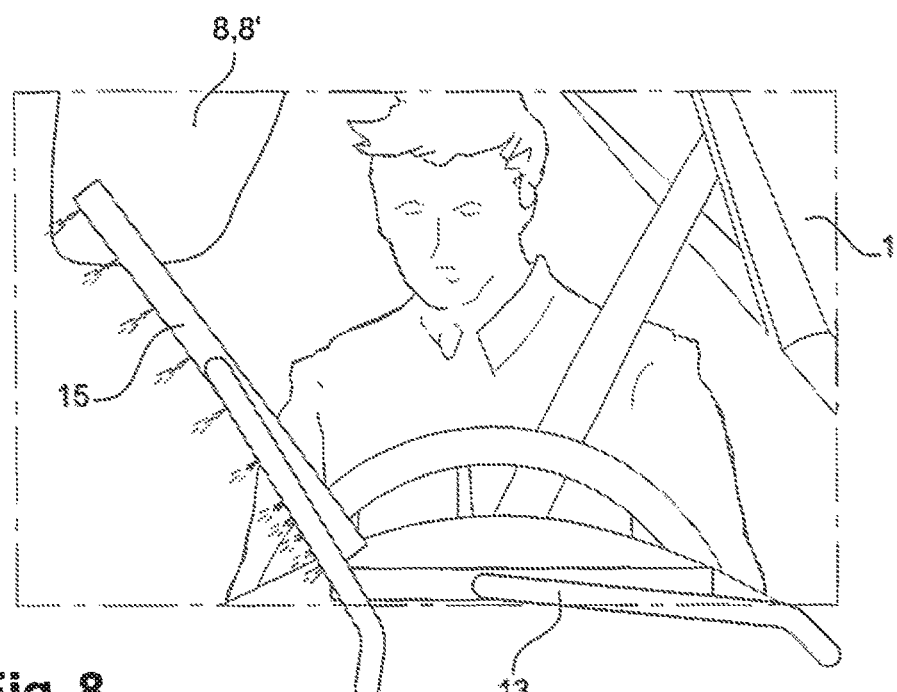

As can be understood from FIGS. 7 and 8, the spraying means can be in the form of rails which extend along substantially the entire length of the wipers. Each wiper 13, 15 preferably comprises a rail on a first side for spraying of liquid on a first side of the wiper, for example upwards when the wiper is being displaced in an ascending phase, and a rail on the other side for spraying of liquid on this side of the wiper, for example downwards when the wiper is being displaced in a descending phase.

The motors 14 are of the electronic type, and are each associated with electronic control means 30 such as a printed circuit board which can control the motor, as well as the activation or deactivation of the device for supplying washing liquid, for example by supplying the washing liquid circulation pump electrically.

In a conventional manner, the means 30 for controlling the motors 14 are configured to activate the motors when cleaning of the areas 4, 6 is required. According to the invention, they are also configured to activate a single one of the wipers, and in particular the wiper, the area of which comprises the aforementioned portion 8 or 8' which covers the sensor 9. This is for the purpose of cleaning this portion. In this last case, the other wiper remains immobile, its motor being inactive.

FIGS. 7 and 8 show embodiments in which the windscreen 1 is similar to that in FIG. 1, and is equipped with a sensor substantially in its middle and in a high position. The control means are then configured to activate the drive motor 14 of the second wiper 15, in order to displace only this wiper and clean the area 6, and thus the portion 8, 8'.

FIG. 7 represents an embodiment in which cleaning liquid is sprayed from the same side of each wiper during the activation of the second wiper 15. Although the first wiper 13 remains immobile, liquid is sprayed from one of its rails. In this case, the liquid is sprayed during the displacement upwards of the second wiper, and during an ascending phase, such that the liquid sprayed is spread and removed as soon as it is deposited on the windscreen.

FIG. 8 represents a variant embodiment in which cleaning liquid is sprayed from one side of the first wiper during displacement. The first wiper 13 remains immobile, and is not used to spray liquid on the windscreen, in this case, the liquid is sprayed during the displacement downwards of the second wiper 15, and during a descending phase, such that the liquid sprayed is spread and removed as soon as it is deposited on the windscreen.

It will be understood from FIGS. 7 and 8 that the visual comfort of the driver is respected, since the inactive wiper 13 does not cross the field of vision of the driver, and does not disturb him during the cleaning of the portion 8, 8'.

The invention claimed is:

1. A system for wiping a vehicle window, the window being equipped with a sensor, the system comprising:
a first wiper for wiping a first area of the window, including a portion which extends at the level of the sensor;
a second wiper for wiping a second area of the window, different from the first area;
means for activation of the first and second wipers for the purpose of their displacement on the window; and
electronic means for control of the means for activation based on a command that identifies a portion of the first area requiring cleaning, wherein the command is generated in response to the sensor detecting a dirty condition of the portion of the first area,
wherein the means for activation comprise a first motor for activation of the first wiper, and a second motor for activation of the second wiper,
wherein the electronic control means are configured to activate, in response to the command, only the first motor for cleaning of the portion of the first area,
wherein activating only the first motor for cleaning of the portion prevents impeding visibility on a driver's side of the vehicle by the second wiper.

2. The system according to claim 1, wherein the first wiper is a wiper which is configured to be situated on a driver's side of the vehicle.

3. The system according to claim 1, wherein the first wiper is situated on passenger's side of the vehicle.

4. The system according to claim 3, further comprising: spraying means having two spraying rails disposed along a length direction and on opposing sides of the first wiper,
wherein the electronic control means are configured to spray, in response to the command, liquid from one spraying rail only of the first wiper and/or during a phase of descent only of the first wiper on the window.

5. The system according to claim 1, wherein the portion is situated substantially in a middle of the window.

6. The system according to claim 1, wherein the portion is situated on one side of the window.

7. The system according to claim 1, further comprising means for spraying cleaning liquid, the control means being configured to activate spraying of liquid when cleaning of the portion is required.

8. The system according to claim 7, wherein the spraying means are supported by the first wiper.

9. A method for wiping a vehicle window by a system according to claim 1, comprising a step of: b) activating only the first motor when cleaning of the portion is required, the second motor remaining inactive.

10. The method according to claim 9, comprising a preliminary step of: a) emitting a signal to the control means for the purpose of activation only of the first motor.

11. The method according to claim 10, wherein the emission of the signal is derived from a command issued by a driver of the vehicle, or by detection of dirt on the portion by the sensor.

12. The method according to claim 9, further comprising during step b), a sub-step consisting of activating spraying of liquid onto the window.

13. The method according to claim 12, wherein the spraying of liquid takes place from one side only of the first wiper.

14. The method according to claim 13, wherein the spraying of liquid takes place during a phase of descent of the first wiper on the window.

* * * * *